Figure 1:
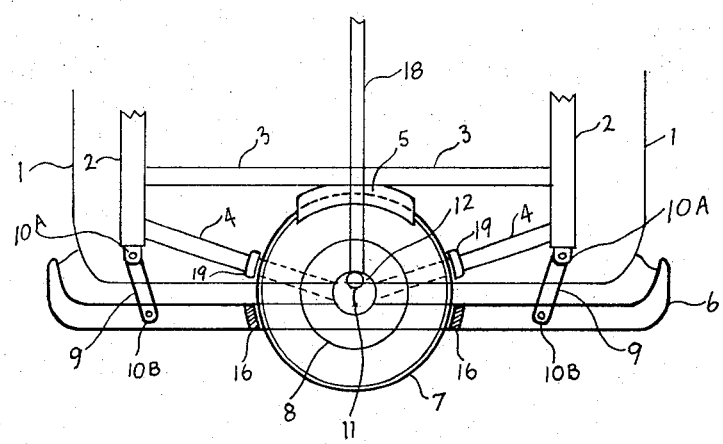

United States Patent [19]
Eshelman

[11] 3,866,962
[45] Feb. 18, 1975

[54] LATERAL MOTION BUMPER SYSTEM
[76] Inventor: Cheston Lee Eshelman, 621 N.E. 30th Ter., Miami, Fla. 33137
[22] Filed: Sept. 24, 1973
[21] Appl. No.: 400,225

Related U.S. Application Data
[63] Continuation-in-part of Ser. No. 325,822, Jan. 22, 1973.

[52] U.S. Cl.............. 293/19, 224/42.04, 293/63, 293/69 R, 293/71 P, 293/72, 293/84, 293/89
[51] Int. Cl.... B60r 19/10, B61f 19/04, B61g 11/08
[58] Field of Search ........ 224/42.04, 42.06; 293/19, 293/71 P, 72, 84, 63, 69 R, 89

[56] References Cited
UNITED STATES PATENTS
| | | | |
|---|---|---|---|
| 1,672,335 | 6/1928 | O'Meara | 224/42.04 |
| 1,777,342 | 10/1930 | Williams | 293/84 |
| 1,792,157 | 2/1931 | Franke | 293/72 |
| 2,131,746 | 10/1938 | Morrison | 224/42.04 |
| 2,196,225 | 4/1940 | Morrison | 224/42.04 |
| 3,120,973 | 2/1964 | Ramsey | 293/84 |
| 3,502,362 | 3/1970 | Eshelman | 293/19 |
| 3,603,633 | 9/1971 | Eshelman | 293/19 |
| 3,708,195 | 1/1973 | Kottsieper | 293/19 |
| 3,774,950 | 11/1973 | Weller | 293/84 |

Primary Examiner—M. Henson Wood, Jr.
Assistant Examiner—Howard Beltran

[57] ABSTRACT

In a highway type motor vehicle, a vehicle wheel and wheel mounted pneumatic tire or other absorbant element positioned in the front or rear of the vehicle, with the wheel and tire or other absorbant element substantially parallel to the highway surface about the height of a standard automobile bumper and having means for supporting same securely to the frame of the vehicle so that the front exposed tire and wheel or other absorbant element will act as a Lateral Motion Bumper System having a fulcrum-hinged, bumper bar that is thrust laterally against the spare tire as it moves longitudinally upon collision, into an obstruction, at the front or corner of the vehicle, dissipating the energy of motion into the pneumatic tire, instead of destruction of the sheet metal, because the energy of motion is used up in the 360° compression of the spare tire and wheel or other absorbant element upon collision into an obstruction at the front or corner areas of the vehicle.

7 Claims, 7 Drawing Figures

LATERAL MOTION BUMPER SYSTEM

This is a continuation-in-part of my copending application Ser. No. 325,822, filed Jan. 22, 1973.

My invention relates to an improvement in a Lateral Motion Bumper System for a highway vehicle using a pneumatic tire and wheel or other absorbant element mounted to the front or the rear of the vehicle so that it will operate to absorb the energy of a collision, to offer "crash-worthiness," and to help protect the occupants from death or injury and help prevent the vehicle from unnecessary damage in a collision.

With the ever-increasing use of express highways and the high cruising speed of modern automobiles plus the increased number of vehicles on the roads, there is a steady increase in traffic collisions with many deaths and serious injuries due to high speed collision with a barrier or head-on collision into an oncoming vehicle. One can hardly read a newspaper or watch the news on television without seeing a head-on collision of an automobile resulting in fatalities or injuries.

With all of the developments in modern passenger automobiles, trucks, busses, and station wagons including the engines and bodies, the bumpers have been neglected by the industry.

The standard pneumatic tire and pressed steel wheel are very rugged and will resist being compressed out of their round shape. In most serious accidents, where the vehicle body is crushed out of shape and the engine is torn from its mounts, the spare tire and wheel are usually not damaged nor are the wheels on the vehicle.

There are between twenty-six and twenty-nine inches of absorption material, measured along a diameter of the wheel, consisting, in order, of a layer of rubber and cord, a layer of compressed air, and another layer of rubber and cord. All these layers must be collapsed before the struck object can reach the main body or cab of the vehicle.

The advantages of this thickness of absorption materials are obvious in absorbing the energy of collision and decelerating the vehicle whereby fatalities, serious injuries and property damage are reduced by an estimated 50 percent. Tests have shown that a car equipped as described above can drive head on into a concrete wall at 40 miles per hour and not break the headlights.

It is an object of my invention to supply an absorption device which I have named the "Lateral Motion Bumper System." This device will absorb the energy of a collision to an extent far greater than is possible with Hydraulic Cylinder Absorbers or plastic concepts for bumpers.

It is a further object of my invention to provide small, medium, and large automobiles, trucks, busses, and station wagons with the disclosed invention mounted as described.

It is a still further object of my invention to move the spare tire and wheel from the trunk of the vehicle or other storage space and to mount it on the vehicle in front and substantially parallel with the road surface, where it will serve best as a Lateral Motion Bumper System.

It is another object of my invention to so mount the wheel or other absorbant element on the front of the vehicle that it will be interposed between the vehicle and any barrier with which a collision may occur.

It is yet another object of my invention to provide the tire portion of the Lateral Motion Bumper System with a cover to protect it from the elements.

It is yet another object of my invention to provide means for a Lateral-Motion, fulcrum-hinged, bumper bar which is thrust laterally against the spare tire, as it moves, longitudinally upon collision, into an obstruction, at the front or corner of the vehicle, dissipating the energy of motion into the pneumatic tire, or other absorption element, instead of destruction of the sheet metal and injury to the occupants.

It is yet another object of my invention to manage the energy of motion by using it up in the 360° compression of the spare tire and wheel (front, rear, R side, L side) with gradual dissipation of forces.

Other objects and advantages of the present invention will be readily appreciated from the following description when considered in connection with the accompanying drawings wherein;

FIG. 1, Top view of the Lateral Motion Bumper System installed on the front of a motor vehicle.

Figure 2:
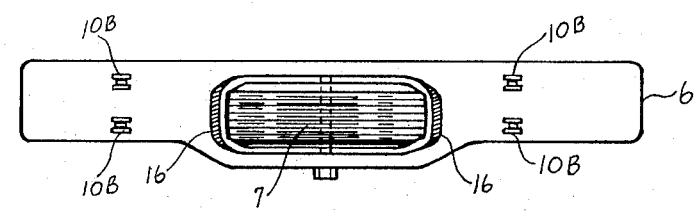

FIG. 2, Front view of the Lateral Motion Bumper System installed on the front of a motor vehicle with the floating absorbant element within the bumper rail top and bottom edges, such as in a wide face bumper rail.

Figure 3:
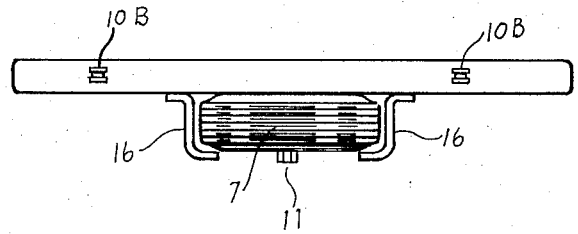

FIG. 3, Front view of the Lateral Motion Bumper System installed on the front of a motor vehicle with the floating absorbant element below the bumper rail bottom edge, such as in a narrow face bumper rail.

Figure 4:
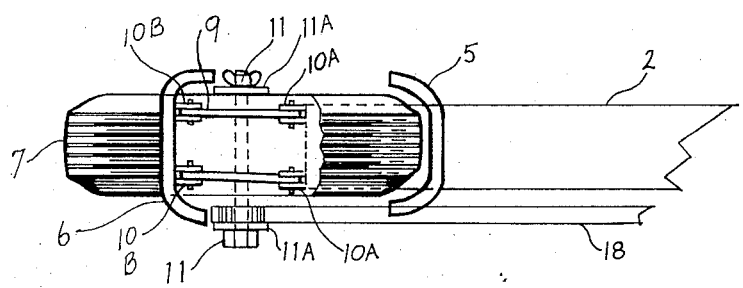

FIG. 4, Side view partly in section of the Lateral Motion Bumper System installed on the front of a motor vehicle, taken at the hinge line of FIG. 2.

Figure 5:
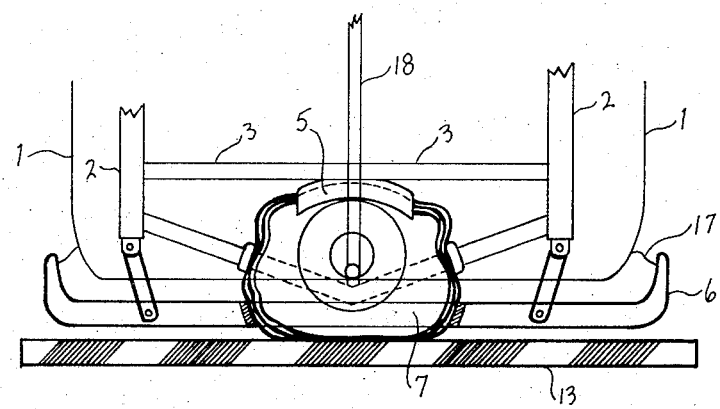

FIG. 5, Top view of the Lateral Motion Bumper System showing the absorption taken in a front head-on collision.

Figure 6:
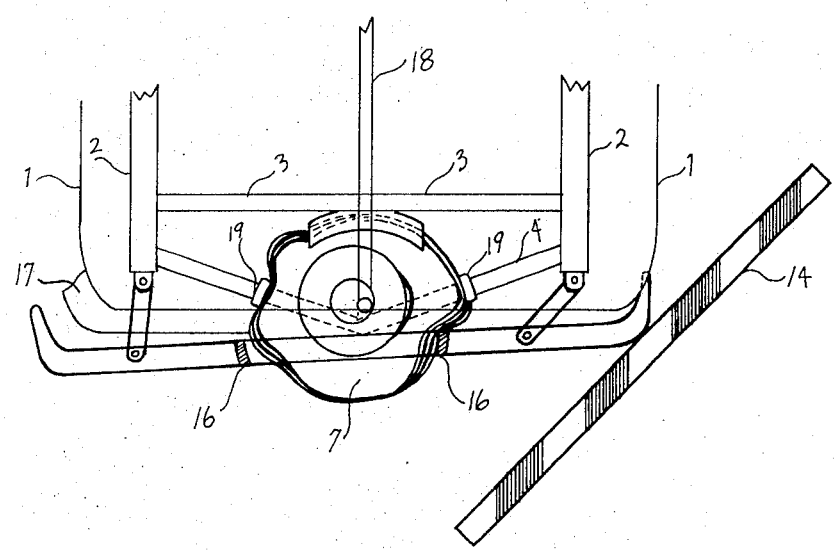

FIG. 6, Top view of the Lateral Motion Bumper System showing the absorption taken in 45° front corner collision L.H.S.

Figure 7:
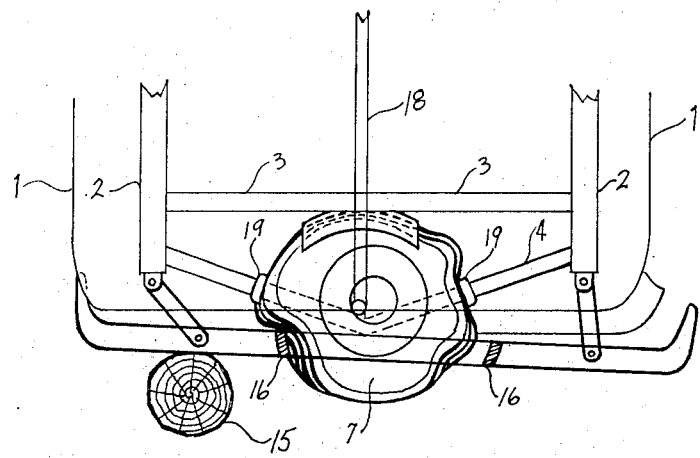

FIG. 7, Top view of the Lateral Motion Bumper System showing the absorption taken in a quarter-front collision into a pole R.H.S.

No. 1, Vehicle body.
No. 2, Vehicle longitudinal frame.
No. 3, Vehicle lateral frame.
No. 4, Vehicle diagonal lateral frame.
No. 5, Restricted nesting stop at rear of tire.
No. 6, Bumper rail.
No. 7, Tire and wheel or other absorbant element.
No. 8, Rim of wheel.
No. 9, Fulcrum hinges.
No. 10A, Fulcrum hinge pivot points rear.
No. 10B, Fulcrum hinge pivot points front.
No. 11, Retainer pin for wheel.
No. 11A, Large washer for retainer pin.
No. 12, Large hole for retainer pin.
No. 13, Head-on barrier.
No. 14, 45° corner barrier.
No. 15, Quarter-front barrier.
No. 16, Blunt bracket for bumper rail contact with tire.
No. 17, Sight shield.
No. 18, Alternate longitudinal frame.
No. 19, Restricted nesting stop on either side of tire frame.

When bumper rail 6 is struck on the corner or end as in FIG. 6 it swings laterally of the vehicle against the tire 7 or other absorbant element. It also thrusts laterally against the tire 7 or other absorbant element. It also swings longitudinally because of the fulcrum hinges 9 which pivot on pins 10A and 10B.

As the bumper rail 6 swings longitudinally upon impact it compresses the tire 7 at the blunt bracket 16 on the rail 6. This pressure on the tread of the tire 7 causes the wheel rim 8 to float away from the pressure as in FIG. 6 and against the restricted nesting stops 19 on frame 4. This causes the tire to be compressed from each side and this amount of compression is equal to the travel of movement of bumper rail 6.

If the collision is head-on then the tire is forced back against the rear restricted nesting stop 5 thus compressing the tire 7 from front-and-rear as the wheel floats around the retainer pin 11 in the large hole 12 inside the large retainer pin washers 11A, which are located on the top and bottom ends of the retainer pin 11 to keep it from falling out of the large hole 12.

The longitudinal frame 2 supports the mounting for the fulcrum hinges 9 and attaches to the vehicle lateral frame 3 and vehicle diagonal lateral frame 4. These frames all converge at the point of the large hole 12. These frames also support the restricted nesting stops 5 and 19.

The fulcrum hinges pivot at the rear end on pivot point 10A and on the front end pivot points 10B. Points 10B are set somewhat closer together than points 10A so that the hinge arms are always on an angle. When force is applied to the angle it tends to close, thrusting the bumper rail 6 laterally.

Alternate longitudinal frame 18 is optional. The space between the bumper rail 6 and the car body 1 is covered by a flexible sight shield 17.

The tire and wheel 7 are readily removable by disconnecting retainer pin 11. When a collision occurs with an obstruction such as 13, 14 or 15, the bumper system protects the car body 1 from damage and also protects the occupants within the car body 1 by the invention heretofore described.

Having thus described my invention, I claim:

1. A lateral motion bumper system for a motor vehicle having a frame comprising, a bumper rail mounted on a longitudinal extremity of said frame transversely thereof, a wheel and inflated tire horizontally positioned and partially surrounded by said bumper rail, stop members for bearing against said tire and said frame, and hinge means connecting said bumper rail and said frame so that when said bumper rail strikes an obstruction before it, the rail will be moved transversely and longitudinally of the vehicle to strongly thrust the wheel and tire against the stop members.

2. The invention as set forth in claim 1, in which the wheel and tire rest floatingly in an aperture in the bumper rail, there being means for limiting the movement of the wheel and tire, and there are brackets on said bumper rail for contacting said tire and forcing it to contact said stop members when said bumper rail is moved.

3. The invention as set forth in claim 2, in which the means for limiting movement of the wheel and tire is a long retainer pin extending through the center hole of the wheel and connected to the vehicle frame and there is a back stop on the frame for limiting rearward movement of the wheel and tire.

4. The invention as set forth in claim 2, in which a cover is provided for the wheel and tire to protect them from the elements.

5. The invention as set forth in claim 1, in which said hinge means comprises hinge links each pivotally connected at one end to the bumper rail at an extremity thereof and at their other end pivotally connected to the vehicle frame.

6. The invention as set forth in claim 5, in which the axes of the hinge links pivots are vertical whereby the hinge links are swingable horizontally and the bumper rail moves horizontally when it strikes an obstruction.

7. The invention as set forth in claim 1, in which the bumper rail is mounted on the forward extremity of the motor vehicle frame.

* * * * *